United States Patent [19]
Hobson, Jr. et al.

[11] 3,742,305

[45] June 26, 1973

[54] ELECTRIC SHOCK PROTECTOR FOR USE WITH PANEL ASSEMBLY

[75] Inventors: Charles F. Hobson, Jr., Southington; Herbert M. Dimond, Hartford, both of Conn.

[73] Assignee: General Electric Company, New York, N.Y.

[22] Filed: Aug. 13, 1971

[21] Appl. No.: 171,770

Related U.S. Application Data

[63] Continuation of Ser. No. 60,584, Aug. 3, 1970, abandoned.

[52] U.S. Cl. ............... 317/18 D, 317/27 R, 317/113
[51] Int. Cl. ............................................. H02h 3/28
[58] Field of Search ................... 200/168; 335/8, 9, 335/10; 317/99, 120, 113, 18 D, 27 R

[56] References Cited
UNITED STATES PATENTS
3,636,482  1/1972  Edmunds .............................. 335/6
3,470,507  9/1969  Hall et al. ............................ 335/174

*Primary Examiner*—James D. Trammell
*Attorney*—Robert T. Casey

[57] ABSTRACT

A unitary assembly comprising an insulating housing which includes an automatic electric circuit breaker, an electrically operated means for causing automatic opening of the circuit breaker in response to a given electric signal, highly sensitive ground-fault-detecting means for detecting a ground fault in a load circuit fed by the said circuit breaker and for generating an output signal in response thereto, and means for energizing said electrically operated means upon the occurrence of said output signal. The assembly has form and dimensions suiting it for mounting in a conventional panel assembly or load center of standard construction which may also contain conventional circuit protective devices. In a preferred form, the circuit breaker portion of the assembly comprises a prior art standard circuit breaker having a housing of prior art standard form and dimensions.

19 Claims, 6 Drawing Figures

INVENTORS
Charles F. Hobson, Jr.
Herbert M. Dimond
BY Robert P. Casey
ATTORNEY

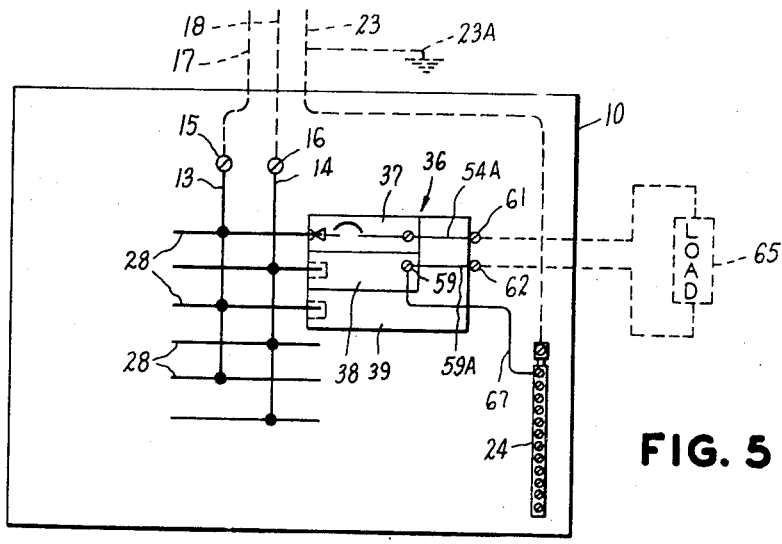
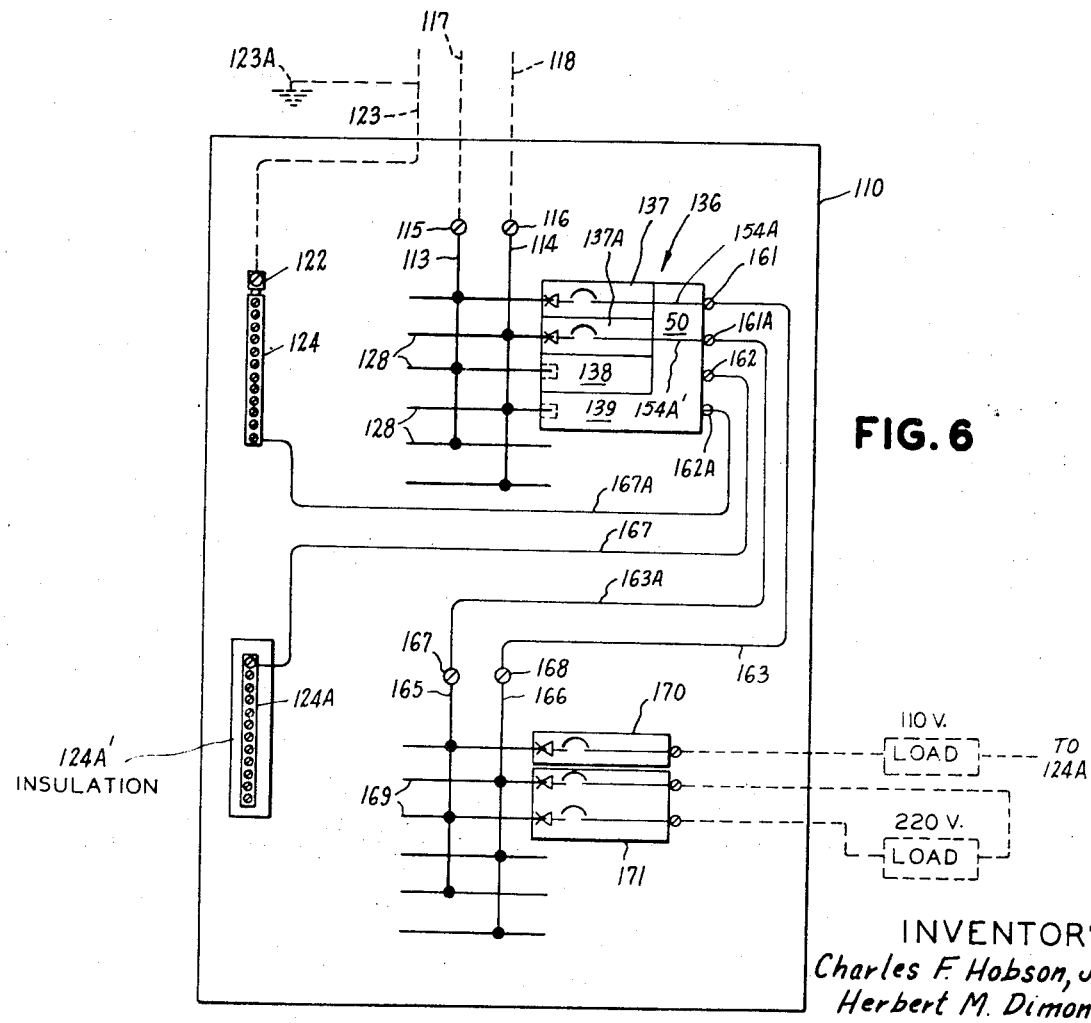
FIG. 5
FIG. 6
INVENTORS
Charles F. Hobson, Jr.
Herbert M. Dimond
BY Robert P. Casey
ATTORNEY INVENTORS
Charles F. Hobson, Jr.
Herbert M. Dimond
BY Robert A. Casey
ATTORNEY

ELECTRIC SHOCK PROTECTOR FOR USE WITH PANEL ASSEMBLY

This case is a continuation of application Ser. No. 060,584 filed Aug. 3, 1970, now abandoned.

BACKGROUND OF THE INVENTION

1. Field of the Invention

The term, "electric shock protection device," as used herein refers to a device which operates automatically to disconnect a particular energized power conductor when and if the person comes in contact with that conductor and at the same time with another conducting medium, usually a grounded conducting medium, in such a way as to tend to cause electric current to pass through his body. Devices of this general type have long been available in the prior art. Usually, such devices operate on the principle that when a person contacts an energized power conductor, in the manner described, his body provides a path for at least a small part of the current to flow to the opposite side of the circuit without passing through a predetermined conductor portion where a current sensor is located. This causes an unbalance to occur in the total current passing through all conductors at the current sensor location. This is because part of the current is bypassed around the sensor by a path which includes the person's body.

In order to provide the speed and sensitivity necessary to protect the person from damage by electric current, the shock-protection device must respond to extremely small differences in such currents or extremely small current unbalance, and must operate at sufficient speed. The "unbalance" in the currents is commonly detected by a "differential transformer" or "zero-sequence" transformer, comprising a winding encircling all conductors of the circuit and acting as the secondary winding of a transformer, of which the circuit conductors act as primary windings. When the algebraic sum of the currents in circuit conductors is zero, the voltage generated in the secondary winding is zero. When some current is bypassed around the differential transformer, however, a signal voltage appears across the secondary winding. Since this signal voltage is ordinarily very small, amplifying means must be provided, or a sensitive relay (or both) must be used to provide a usable power output. The output of the amplifying means or relay is connected to an electrically operated means which opens contacts in series with one or more of the power conductors, thereby removing the voltage and protecting the person from electrical shock. Other means of detecting current unbalance are also known and may be utilized.

In accordance with the prior art, the aforesaid apparatus is commonly provided in one of two physical forms. In a first type of installation, the apparatus is housed in a suitable enclosure, such as a metallic box, which is mounted at a desired location and which receives an incoming power cable and has outgoing power conductors to the electrical loads desired to be supplied subject to the shock-protection feature. This has required the provision and installation of a separate box in addition to the usual panel enclosure which serves to house and mount the basic power control and protective device for power coming into a given building or part of a building and which contains electrical protective devices supplying other circuits which may not need to be provided with electric shock protection. In the second form, the electric shock-protection device is made portable, that is, is provided with its own enclosure with conductors and connecting means for connecting to a given power supply, and carries outgoing terminals or sockets for supplying the loads to be protected. This form is, by its nature, not intended or suited for permanent installation.

In either of the foregoing cases, it will be observed that the shock-protection device requires the expense of a special enclosure and incoming and outgoing conductor terminal means. In a permanent installation, such a protection device must be suitably affixed to the wall of a building and connected by conduit or other approved connecting means to the panel and load center containing the other circuit-protecting devices for the building or part of the building.

In addition, prior art protection devices of this type have comprised means supporting the various components and wiring, some of which is added at time of installation, interconnecting the components.

OBJECTS OF THE INVENTION

It is a general object of the invention to provide an electric shock-protection device which is self-contained and extremely compact and which requires a minimum of connection to be made at the time of installation by the user.

It is an object of the present invention to provide an electric shock-protection device which can be readily mounted as a unit in existing circuit protective device panel assemblies and load centers.

It is another object of the invention to provide a unitary electric shock protection device including an electric circuit breaker portion which is of conventional construction and the mounting provisions of which are essentially unaltered from standard prior art circuit breakers so that the shock protection device may conveniently be mounted in esisting circuit protective device panel assemblies and load centers.

It is a further object of the invention to provide an electric shock protection device including the following components: electric circuit breaker, electric current unbalance detector, electronic switch, and electrically operable means for tripping the circuit breaker, wherein all of the components are protected from accidental physical contact damage and wherein all wiring interconnecting the components is likewise covered and protected, the only exposed conductive parts being the terminals which the user must employ when installing the device.

It is a further object of the invention to provide an electric shock protection device of the type including an automatic electric circuit breaker, a current unbalance detecting means, a highly sensitive relay or "electronic switch," and an electric operating means for the circuit breaker, all of which components are arranged in a unitary housing having a form and dimension suitable for mounting of the assembly in a conventional circuit protective device panel assembly or load center.

It is a still further object of the invention to provide a shock protection device of the type described in which the major components each occupy a space corresponding generally to that occupied by a single-pole conventional circuit breaker adapted for mounting in a conventional device panel assembly or load center.

SUMMARY OF THE INVENTION

In accordance with the invention in the one form, an electric shock protection device is provided including an electric circuit breaker portion having its casing conforming in form and dimensions to that of a conventional automatic electric circuit breaker adapted for panel assembly mounting. In addition, in accordance with the invention, the shock protection device includes additional portions alongside the circuit breaker portion and integrally connected thereto including an electrically operated tripping means for opening the circuit breaker, and electric signal generating means for generating a predetermined signal upon the occurrence of a predetermined relatively small unbalance in the currents in predetermined conductor portions. In addition, a sensitive relay or "electronic switch" is provided for energizing the electric tripping means when the aforesaid signal occurs.

In a particular form of the invention, the portions alongside the circuit breaker portion include electric tripping means in a first sidewise adjacent compartment, and electronic signal amplifying means or "electronic switch" means in a second sidewise adjacent compartment. Further, in accordance with the invention, the aforesaid signal generating means comprises a differential transformer through which conductors of the circuit controlled by the circuit breaker pass.

In accordance with another aspect of the invention, the shock protection device is provided with means for mounting and connecting it in a panel which includes a central row of plug-in type terminal-connecting blades connected to the incoming power source and provided with a row of retaining hook portions spaced from the connecting blades for retaining circuit breakers in the panel assembly. It will be appreciated, however, that we may provide the shock protection device with means adapting it for connection by bolting means instead of plug-on arrangement.

The circuit breaker portion of the shock protection assembly is provided with a plug-in type contact and with at least one retaining means adapted to engage a hook portion of the panel assembly to permit the shock protection device to be mounted in the panel assembly by plug-in engagement. The adjacent portions of the protection device enclosing the electric operating means and the amplifying means are provided with clearance openings permitting the assembly to be mounted in the manner of a multipole circuit breaker and occupying spaces which would ordinarily be occupied by single-pole standard circuit protective devices.

It is also within the contemplation of my invention, as will be described more in detail hereafter, to provide a shock protection device in which the circuit breaker portion comprises a multipole circuit breaker, such as a two or three-pole circuit breaker, the remainder of the device being otherwise generally as described above.

DESCRIPTION OF THE DRAWINGS

In the drawings,

FIG. 5 is a schematic representation showing the connections between the electric shock protection device of FIG. 1 and the main bus bar conductors and neutral terminal strip of the panel assembly.

FIG. 6 is a schematic representation of another embodiment of the invention comprising a panel assembly incorporating the invention in which a shock protection device feeds a number of secondary circuit breakers and therefore serves to provide electric shock protection to a corresponding number of separate circuits, while the panel also includes means for supplying power to a number of other circuits not controlled by the shock protection device.

DETAILED DESCRIPTION OF A PREFERRED EMBODIMENT

Figure 1:
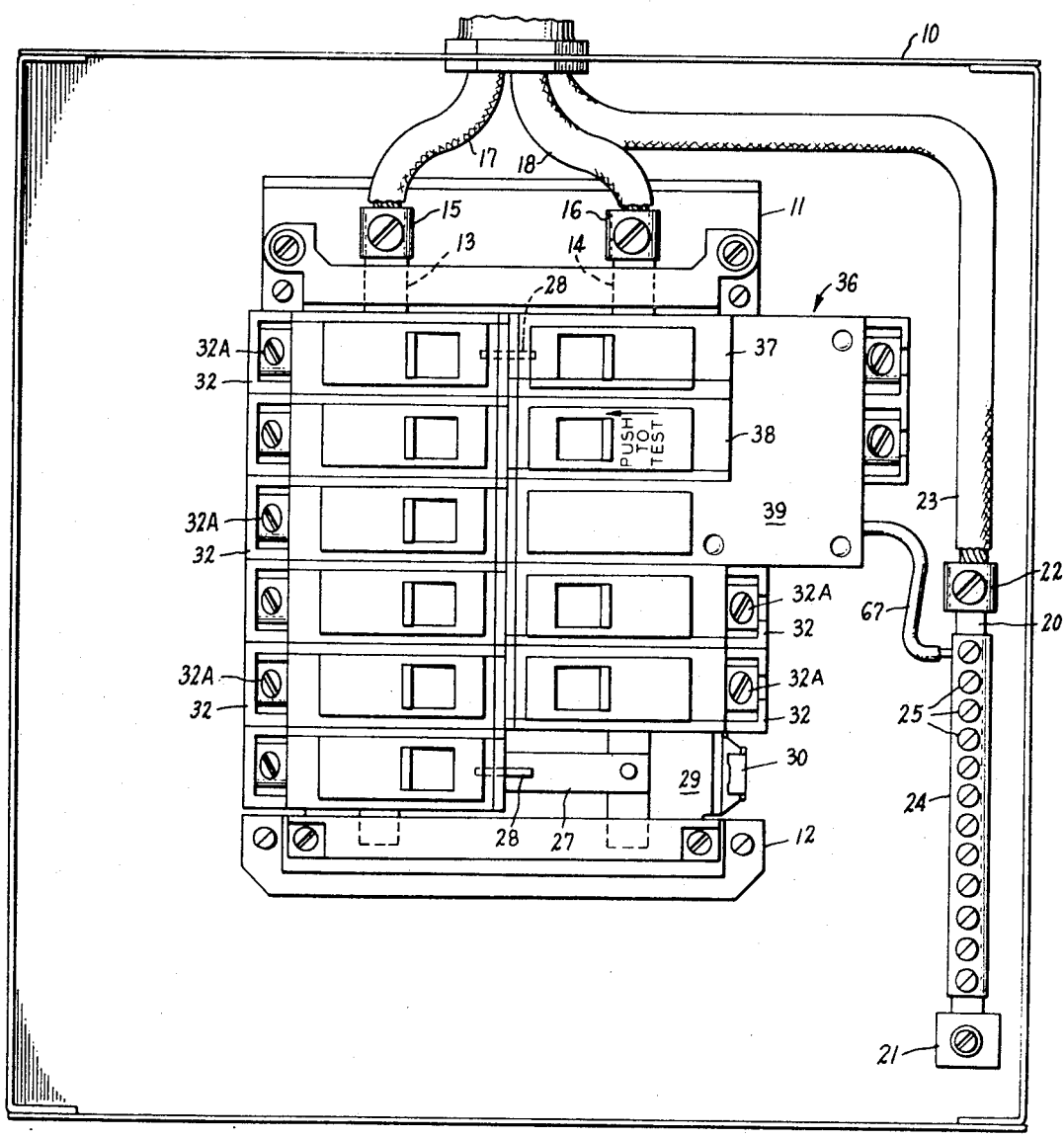
FIG. 1 is a front elevation view of a circuit protective device panel assembly or load center of conventional construction, having the novel electric shock protective device of the present invention mounted therein. The panel assembly or load center is pictured as in installed condition, mounted on a vertical wall surface, with the cover of the main enclosure omitted.

The invention is shown in FIG. 1 as incorporated in an electric protective device panel assembly or load center including a generally rectangular box-like metallic enclosure 10 having insulating means comprising upper and lower insulating supports 11 and 12 supporting a pair of spaced parallel power bus bars 13 and 14. The bus bars 13 and 14 are provided with screw-type connecting terminals 15 and 16, respectively, for connecting incoming power cables such as 17 and 18. The box 10 also supports a multiple terminal connector assembly comprising a conductive strap or neutral bar 20 suitably mounted in the box 10 such as by means of clamp 21 and cable connector 22 which serves to connect the strap 20 to an incoming neutral conductor 23 which is connected to ground as at 23A (see FIG. 5). A generally tubular metallic sleeve 24 surrounds the strap 20 and carries a number of clamping screws 25, each of which is adapted to clamp a conductor which may have its end inserted through an opening, not shown, in the side wall of the body 24. The neutral bar 20 and sleeve 24 may be, and usually are electrically connected to the enclosure 10 ("bonded neutral").

The bus bars 13 and 14 each have a plurality of transversely extending connecting straps such as 27 (only one shown) terminating in upstanding transversely extending contact blade portions 28 (only two shown). The box 10 also includes a supporting pan 29 (see FIG. 4) having a row of inturned hook portions 30 at each side for retaining electric circuit breakers 32, all in a conventional manner. A panel assembly having the general construction characteristics as shown herein is shown and described in greater detail in prior patents assigned to the same assignee as the present invention, see, for example, U.S. Pat. Nos. 3,403,301, J. J. Mrowka et al., Sept. 24, 1968 and 3,463,967, K. W. Klein, Aug. 26, 1969.

A number of conventional prior art circuit breakers 32 are shown in FIG. 1, each having an incoming load terminal comprising a socket, not shown, including jaws adapted to engage a portion of a corresponding one of the blades 28 by a plug-in type engagement. The circuit breakers 32 also include outgoing terminals including clamping screws 32A adapted to receive and clamp the ends of conductors, not shown, leading outwardly to electric loads controlled by the respective circuit breakers.

The power circuit through one of such circuit breakers may therefore be traced as follows. Incoming power enters through the conductors 17 and 18, to the bus bars 13 and 14. Power flows from the blade-like terminals 28 to each of the circuit breakers 32, through the output terminals 32A of the circuit breakers 32 to the respective loads, and back from the loads to the neutral bar 20, to the neutral conductor 23. For phase-to-phase loads, the load would be connected between the conductors 17 and 18 by means of a two-pole circuit breaker, the current path being from one of the bus bars 13,14, through one of the circuit breaker poles, through the load, and back to the other bus bar 13, 14, through the other pole of the two-pole circuit breaker.

In accordance with the present invention, an electric shock protection device is provided which is indicated generally at 36.

The shock protection device 36 comprises a generally rectangular insulating casing having a plurality of chambers, to be described. The particular form and method of construction and assembly of the insulating casing may be varied considerably. Certain advantages are obtained, however, by the particular form and construction shown herein.

Figure 2:
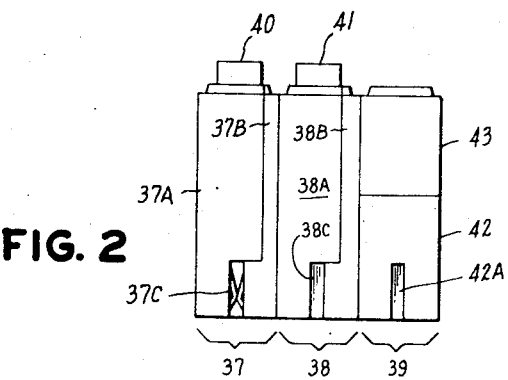
FIG. 2 is an end elevation view of the power input end of the shock protection device as shown in FIG. 1.

In accordance with a preferred embodiment of the invention, the insulating casing for the shock protection device 36 comprises two generally rectangular casings 37 and 38 and a third, generally L-shaped, casing 39 to be described. The casing section 37 in effect comprises a conventional circuit breaker with its insulating housing of generally rectangular configuration comprising a main portion 37A and a cover portion 37B (see FIG. 2) closing the open side of the main portion 37A and supporting the circuit breaker parts therein, including the circuit breaker operating handle 40.

The casing section 38 also comprises a self-contained generally rectangular insulating enclosure of two parts similar to that of the circuit breaker portion 37 and including a main portion 38A and a cover portion 38B. A handle 41 is also included for a purpose to be described.

Figure 4:
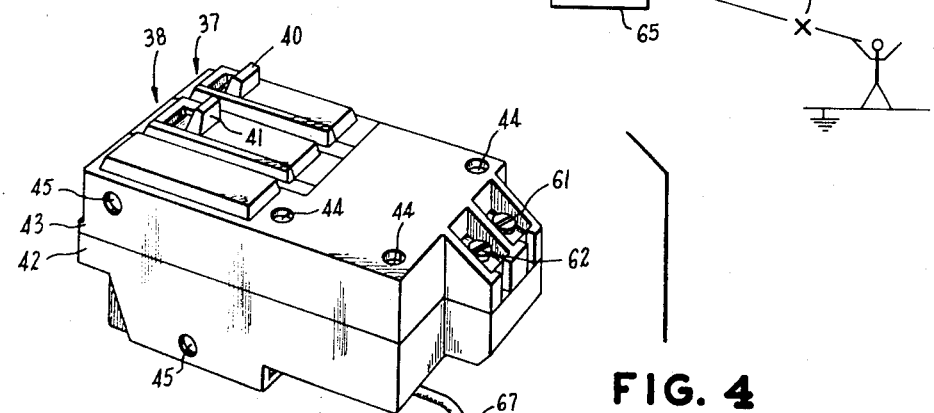
FIG. 4 is a perspective view of the electric shock protection device of FIG. 1, shown in exploded relation to the hook retaining portions of the panel assembly or load center.

In accordance with the invention, the remaining portion of the casing of the shock protection device 36 comprises a generally L-shaped enclosure 39 formed by mating bottom and top molded insulating pieces 42, 43, see FIG. 4. The base and cover members 42, 43 each have generally planar bottom and top surfaces respectively and perpendicularly extending side walls. The base and cover members 42, 43 are held together in a suitable manner, such as by screws 44. The casing sections 37, 38 are held together and held to the remaining casing section by means of transversely extending bolts or rivets 45.

Figure 3:
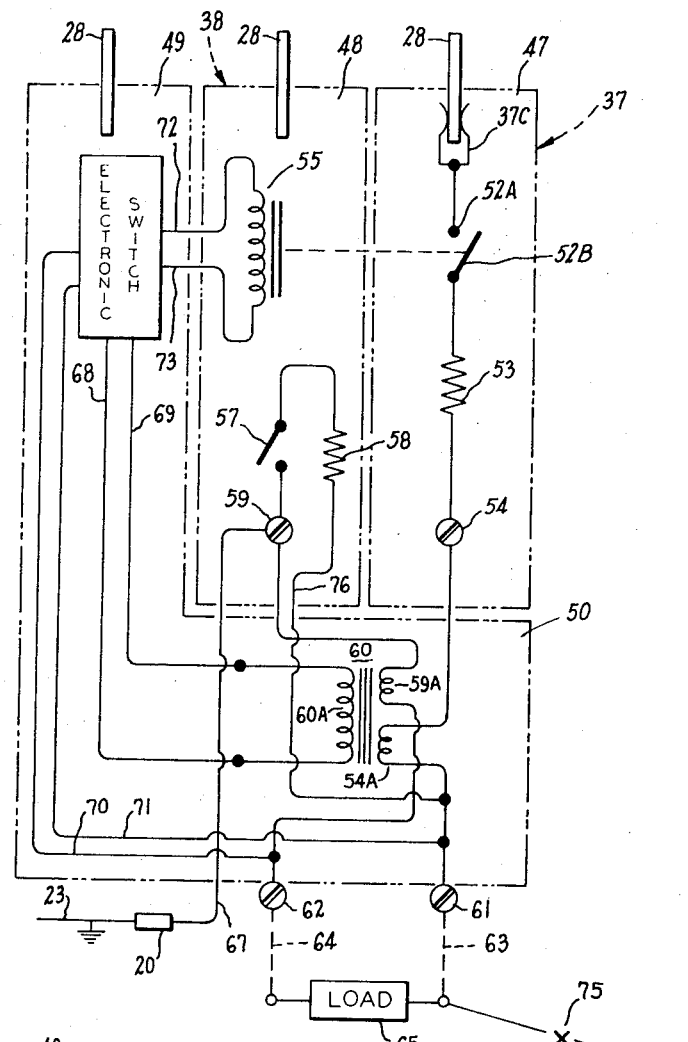
FIG. 3 is a schematic representation showing the circuit connections of the electric shock protection device of FIG. 1 and also showing in dotted lines the outlines of the casing sections.

Referring to FIG. 3, it will be observed that four main chambers are provided by the insulating structure of the invention. These are circuit breaker chamber 47, electric tripping means chamber 48, electronic amplifier or switch chamber 49, and current unbalance detector chamber 50, containing a "differential" transformer 60. In the form shown, the chambers 49 and 50 are contiguous or communicate with each other. It should be understood that the form and arrangement of the chambers in the present device may be varied, although certain distinct advantages are obtained from the arrangement illustrated.

Thus, in accordance with the present invention, the section 37 of the shock protection device 36 comprises essentially a conventional electric circuit breaker as shown, for example, in U.S. Pat. No. 3,288,965 — Klein, Nov. 29, 1966, assigned to the same assignee as the present invention. In addition, the section 38 comprises a casing similar to the casing of circuit breaker section 37, and similar casing and handle parts may be used therefor. In any case, however, all parts of the casing for the protective device 36 are rigidly and permanently joined together to form a unitary casing which is sealed against tampering and which protects the various components within it to be described. The only conductive parts or conductors exposed are those required to be used in installing the device in the panel assembly and comprises two terminals for connection to the power supply conductors, and two terminals for connection to load-supply conductors.

Referring to FIG. 3, the section 37 of the shock protection device comprises an electric circuit breaker which may take any convenient form, such as that shown in the aforementioned Klein patent. In accordance with the present invention, the circuit breaker section 37 includes contact jaws 37C for plug-in engagement with the stationary contact blade 28, and a corresponding aperture formed in the casing. The section 38 also includes an opening 38C, and the base portion 42 of the casing section 39 includes an opening 42A. Sections 37 and 38 and the base 42 also include retainer portions adapted to be engaged under the hooks 30 of the panel assembly. Because of the foregoing provisions, the shock protection device is adapted to be mounted in a conventional panel assembly of the type shown by hooking it under selected hooks 30 and plugging the contact jaws 37C onto a contact blade 28.

Referring to FIG. 3, the circuit breaker portion 37 includes, in addition to the contact jaws 37C, separable contacts 52A and 52B and a suitable serially-connected trip device represented schematically at 53, and a terminal screw 54.

An operating handle 40 (see FIGS. 2 and 4) is also provided for manually operating the contacts 52A, 52B. The operating mechanism which is used for this purpose is not shown, since it may be conventional. A suitable operating mechanism is shown and described, for example, in the aforesaid U.S. Pat. No. 3,288,965. The serially connected trip device 53 may include thermal and magnetic current responsive means as shown in the aforesaid Klein patent, or either of them, designed to protect the wiring and/or load device connected to the circuit breaker from abnormal current conditions. If these protective functions are not required to be provided by the device, the trip device 53 may be omitted, so long as the operating mechanism for the contacts is of the type which can be caused to go from closed to open position by electrically operated means such as will be described.

The enclosure section 38 includes an electric solenoid or shunt-trip device shown schematically at 55 which is arranged so that when it is energized it causes tripping of the circuit breaker 37 and automatic opening of the contacts 52A, 52B. The form and arrangement of such solenoid and tripping arrangement may of course be varied. A particular construction, however, is shown in U.S. Pat. No. 3,256,407, K. W. Klein, issued June 14, 1966 and assigned to the same assignee as the present invention. The casing section 49 includes an "electronic switch" assembly 56 for a purpose to be described.

Also included in the chamber 48 is a "test" switch 57, disposed and arranged to be operated by the handle 41 and biased by suitable biasing means, not shown, to the open position, so that the handle 41 is always in the open position when it is not being manually operated. Also in the chamber 48 is provided an electrical resistor 58 for a purpose to be described, and a terminal screw 59.

The casing base portion 42 supports terminal members 61 and 62 for receiving load connecting conductors such as indicated at 63, 64 to supply a load 65.

As indicated in FIG. 3, a conductor 54A extends from the terminal 54 to the terminal 61, and in so doing, passes through a fault signal generating device comprising in this instance a differential transformer 60. The current path extends from terminal 61 through the load 65 by way of conductors 63 and 63, returns to terminal 62, and from thence passes once again through the differential transformer 60 by means of conductor 59A which interconnects the terminals 62 and 59. The terminal 59 is connected to the neutral strap 20 by means of conductor 67. As indicated FIGS. 1 and 4, the conductor 67 is provided integral with the shock protection device 36 in "pig-tail" form, to facilitate installation. In the alternative, a conventional wire connecting terminal may be provided, as will be described later herein in connection with the form shown in FIG. 6. In any case, it will be observed that two "line" terminals are provided, including a first line terminal comprising socket 37C and a second line terminal comprising conductor 67 or other type of connector if used. Also, there are two load terminals, including a first load terminal 61 and a second load terminal 62.

The signal output of the differential transformer 60 is connected by means of conductors 68 and 69 to the electronic switch 56. Power is supplied to the electronic switch 56 by means of the conductors 70, 71, which connect the electronic switch across power conductors 54A and 59A. The "output" of the electronic switch 56 is connected to the electrically operable trip device 55 by means of conductors 72, 73.

The "electronic switch" may comprise any desired consturuction, and, in fact, need not necessarily be "electronic" so long as it is capable of taking the low power incoming signal from the differential transformer 60 and using it when it reaches a predetermined level, to cause operation of the tripping device 55 to cause tripping of the circuit breaker 37.

An electronic switch suitable for use in the disclosed invention is described on pages 166-167 of the Silicon Controlled Rectifier Manual, 4th Edition, published by the General Electric Company, copyright 1967, and available from the Semiconductor Products Department, Electronics Park, Syracuse, N.Y.

In operation, assuming the circuit breaker 37 to be in closed position and supplying power to the load 65, a typical "shock" situation is indicated at 75 as when a person accidentially comes in contact with the conductor 63, while having contact with a ground or current path returning to the conductor 67 by some path other than by means of the conductor 59A. It will be observed that the current passing through the person passes through the primary winding 54A, but does not pass through the primary winding 59A. Instead, the circuit to the neutral conductor 23 is completed through ground, by-passing winding 59A. This causes an unbalance to exist between the currents in the conductors 54A and 59A, causing an output or signal voltage to be created in the differential transformer 60. If this signal voltage is of sufficient magnitude, it causes actuation of the electronic switch 56. Actuation of the electronic switch 56 causes actuation of the electrical operator 55 which trips the circuit breaker 37 and interrupts power to the conductor 54A, therefore removing power from the conductor 63 and the person being subjected to the shock condition.

In order to permit testing the operability of the device after installation, a switch 57 is provided in compartment 38, which may be closed by moving the handle 41. This causes current flow from the conductor 54A at the load side of the differential transformer, permitting it to return to the neutral by means of the conductor 76 and resistor 58 without passing again through the differential transformer 60. In other words, a controlled ground fault current is created. The value of resistor 58 is chosen so that the ground fault current is of a predetermined small value, such as 7 ma, similar to a value it is desired to protect a person against. This causes again a difference or an unbalance to occur, causing actuation of the device and demonstrating its operability.

If desired, the electrically operable device 55 may be included within the circuit interrupter 37. A particularly compact and economical structure may be provided by arranging the winding of 55 so as to create magnetic flux which acts on an armature member already provided in the circuit breaker, such as the armature member 24 of the circuit breaker 10 (FIG. 1) of the above-mentioned Klein U.S. Pat. No. 3,288,965. For this purpose, the winding of 55 may be wound on the field piece 37 of the Klein patent circuit breaker. Other equivalent arrangements may also be utilized.

In FIG. 6, there is shown another embodiment of the invention having additional benefits to those provided in the form illustrated in FIGS. 1-5. This form includes an enclosure 110 supporting terminals 115 and 116 corresponding to terminals 15 and 16 of the FIG. 1 form. In addition, there is provided the first neutral bar assembly 124, connected to a neutral conductor 123 by means of terminal 122. A second neutral bar assembly 124A, is mounted in the enclosure 110 by insulating means such as insulating block 124A', and is not connected electrically to the enclosure 110.

A pair of main bus bars 113 and 114 are mounted in suitably insulated manner in the enclosure 110 and include laterally extending connection members 128 connected to the bus bars 113 and 114 respectively in the manner indicated, so that they are connected to the bus bars 113 and 114 in alternating fashion and so that any pair of adjacent contact members 128 are connected to different bus bars.

An electric shock-protection device is provided in accordance with this form of the invention, as illustrated at 136. This device is generally similar to the device 36 shown and described in connection with FIGS. 1-5 excepting that an additional circuit breaker pole 137A is included which is connected to be operated simultaneously with the circuit breaker pole 137 and to be tripped simultaneously with it. In other words, the circuit breaker poles 137 and 137A comprise a two-pole circuit breaker, one pole of which (137) is connected to a contact member 128 connected to the bus bar 113, and the other pole of which (137A) is connected to a contact member 128 which is connected to the bus bar 114. The protection device 136 also includes an electric tripping member chamber 138 containing a device similar to the device 55 of the form of FIGS. 1–5, for operating or "tripping" the two-pole circuit breaker 137-137A. The protection device 136 also includes a chamber 139 for an "electronic switch" 156, not shown, similar to item 56 of the form of FIGS. 1–5. In addition, the device 136 includes a chamber 50 for housing a differential transformer, not shown, similar to the transformer 60 of the form of FIGS. 1–5. The secondary winding of the differential transformer in this case embraces three conductors, namely, 154A, 154A', and a conductor not shown which is connected between terminals 162 and 162A and interconnects conductors 167 and 167A. In other terms, a magnetic core is provided on which the conductors 154A, 154', and 159A are wound and act as primary windings. A fourth winding 160A, is also wound on the core, and acts as a secondary winding and generate a signal voltage wherever there is a net unbalance of currents in the primaries.

The terminals 161 and 161A are connected to a second set of bus bars 165, 166 by means of conductors 163 and 163A, connection being made by terminals 167 and 168. The bus bars 165 and 166 are provided with contact portions 169 similar to the contact portions 128 of the bus bars 113 and 114. A plurality of circuit breakers or circuit-control devices such as 170 and 171 may be mounted in the lower section of the enclosure 110 and connected to the bus bars 165 and 166 respectively. The differential transformer 160 is connected to the electronic switch 156, the output of which controls the electric tripping device 155. A test switch similar to that shown and described in connection with FIGS. 1–5, which includes the handle 41 and the contacts 57, is also preferably included in the chamber 138.

The contact terminals 169 in the lower section of the enclosure 110 may receive either single-pole circuit breakers such as illustrated at 170 or two-pole circuit breakers such as 171. The two-pole circuit breaker 171 controls a load which is, in effect, connected across the two bus bars 165, 166. The load fed by the circuit breaker 170 is connected between this circuit breaker and the neutral conductor 167.

It will be observed that the neutral current for all loads supplied by the lower section of the load center of FIG. 6, i.e., by bus bars 165 and 166, must pass through the conductor 167 to terminal 162A and then through the differential transformer by means of the conductor 159A to the terminal 162 and then by way of the conductor 167A to the main neutral bar 124. Thus any current which finds its way to ground by another path, such as through a human being having contact with grounded metal, will cause an unbalance in the current conditions inside the differential transformer. This applies to the 220-volt load as well as to the 110-volt load. The neutral bar 124A is supported in insulated relation to the enclosure 110 by an insulation support member 124A'. It is maintained electrically isolated from the enclosure 110 so that the only path for current to get from the neutral bar 124A to the neutral bar 124 is that provided by insulated conductor 167 and conductor 167A.

While the lower section of the load center shown in FIG. 6 comprising the bus bars 165 and 166 and their associated contact terminals and circuit breakers has been shown within the same enclosure as the upper portion of the load center comprising bus bars 113 and 114, their contact terminal members 128 and circuit breakers, and the electric shock-protection device 136, it will be readily obvious that this assembly may be housed in its own enclosure together with the neutral bar 124A, and the conductors 163, 163A, 167, and 167A can be extended between the two enclosures. Here again, as with the form shown in FIGS. 1–5, the connections made between the electric shock protection device and the corresponding bus bars may be made either by plug-in engagement or by bolted connection as may be desirable. In the form of the invention shown in FIGS. 1–5, the chamber 48 serves to house the electric tripping means 55 for tripping the circuit breaker 37 upon the occurrence of predetermined conditions, and it also serves to enclose the "test" button or switch 57 previously described. It will be readily apparent however that the test switch may be located in other chambers if desirable.

It will also be readily apparent that if desired, we may utilize a shock protection device, particularly the type shown in FIG. 6 including a two-pole circuit breaker, to supply all the circuits to be supplied from a given load center. In such a case, the shock protection device would be acting as a "main breaker," and all circuits fed thereby would be subject to the electric-shock protection afforded by the device. Moreover, the shock protection device, whether of the type shown in FIGS. 1–5, or the type shown in FIG. 6, may be mounted in its own outer enclosure, with power conductors such as 17 and/or 18 and a neutral conductor such as 23, coming directly to the protection device itself, without separate bus bars.

As pointed out above, various modifications may be made in the apparatus and arrangements illustrated, and other modifications will occur to persons familiar with and skilled in the art. It is therefore intended, by the appended claims, to cover all such modifications as full within the true spirit and scope of the invention.

What we claim as new and desire to secure by Letters Patent of the United States is:

1. An electrical protective device comprising:
   a. a generally rectangular unitary casing of insulating material;
   b. a contact-operating circuit interrupter in said casing;
   c. an electrically operable device in said casing for causing opening of said contact-operating circuit interrupter upon energizing of said electrically operable device;
   d. an electronic switch means mounted in said insulating casing and connected to said electrically operable device;
   e. a current unbalance signal generating device in said insulating casing for generating a signal upon the occurrence of predetermined current unbalance in a plurality of conductors and means connecting said signal-generating device to said electronic switch;

f. said electrical protective device having first and second externally accessible line terminals for connection to a source of electric power;

g. said electrical protection device having first and second externally accessible load terminals for connection to a load circuit to be controlled by said circuit-interrupter;

h. first electrical conductor means within said casing and including said circuit interrupter connecting said first one of said line terminals to said first one of said load terminals;

i. second electrical condcutor means connecting said second one of said externally accessible line terminals to said second one of said externally accessible load terminals within said casing;

j. said first and second conductor means each including a portion associated with said current unbalance signal generating means, whereby passage of a predetermined current from said first one of said load terminals to said second one of said line terminals by a path not including said conductor portion associated with said current-unbalance signal-generating means causes a predetermined unbalance of currents in said first and second conductor portions, causing said signal-generating means to generate a signal and to actuate said electronic switch; and k. said electronic switch, when actuated, serving to connect a source of electric power to said electrically operable device to operate said electrically operable device and cause opening of said circuit interrupter and removal of power from said first load terminal.

2. An electrical protective device as set forth in claim 1 wherein said casing includes a discrete chamber for said circuit interrupting device including at least one insulating wall member separating said circuit interrupting device from said electrically operable device said electronic switch and said ground-fault signal-generating means.

3. An electrical protective device as set forth in claim 1 wherein said casing comprises a first elongated generally rectangular chamber for said circuit interrupting device, a second elongated generally rectangular chamber for said electrically operable device, and a third elongated generally rectangular chamber for said electronic switch, all of said chambers extending in substantially parallel plane in side-by-side relation.

4. An electrical protective device as set forth in claim 1 wherein said casing includes separate insulating chambers for said circuit interrupting device, said electrically operable device, said electronic switch, and said current-unbalance signal-generating means, respectively.

5. For use in electrical protective device panel assemblies, an electrical protective device comprising:
a. a generally rectangular casing of insulating material;
b. a contact-operating circuit interrupter in said casing;
c. an electrically operable device in said casing for causing opening of said contact-operating circuit interrupter upon energizing of said electrically operable device;
d. a current unbalance signal generating device in said insulating casing for generating a signal upon the occurrence of predetermined current unbalance in a plurality of conductors.

e. said electrical protective device having first and second externally accessible line terminals for connection to a source of electric power;

f. said electrical protective device having first and second externally accessible load terminals for connection to a load circuit to be controlled by said circuit-interrupter;

g. first electrical conductor means within said casing and including said circuit interrupter connecting said first one of said line terminals to said first one of said load terminals;

h. second electrical conductor means connecting said second one of said externally accessible line terminals to said second one of said externally accessible load terminals within said casing;

i. said first and second conductor means each including a portion associated with said current unbalance signal generating means, whereby passage of a predetermined current from said first one of said load terminals to said second one of said line terminals by a path not including said conductor portion associated with said current-unbalance signal-generating means causes a predetermined unbalance of currents in said first and second conductor portions, causing said signal-generating means to generate a signal.

j. means in said casing for causing operation of said electrically operable device upon generation of said signal by said signal-generating means to cause opening of said circuit interrupter and removal of power from said first load terminal, k. said insulating casing comprising at least two insulating housing portions rigidly attached together, one of said housing portions comprising housing means for said circuit interrupter, said circuit interrupter housing portion having a form and dimensions suitable for mounting in electrical protective device panel assemblies capable of receiving circuit interrupters substantially identical to said circuit interrupter but used separately from said electrical protective device.

6. An electrical protective device as set forth in claim 5 wherein said casing also comprises a second housing portion having substantially the same form and dimensions as said first housing portion and positioned alongside of said first housing portion, said second housing portion enclosing at least said electrically operable device.

7. An electrical protective device as set forth in claim 6 wherein said second housing portion also contains a test switch having a handle portion accessible for operation externally of said casing and operable when closed to cause a predetermined controlled current unbalance in said current unbalance signal generating means to demonstrate operability of said protective device.

8. An electrical protective device as set forth in claim 7 wherein said circuit breaker handle and said test switch handle have substantially the same form and dimensions and placement, whereby said protective device may be mounted in a panel assembly with said circuit interrupter modular unit occupying the space provided for a standard circuit interrupter and said second housing portion also occupying a space provided for a standard circuit interrupter, with the handle of said test switch being in the same location as would be occupied by the operating handle of a standard circuit interrupter placed in said space.

9. An electrical protective panel assembly comprising:
   a. a generally rectangular box-like enclosure;
   b. an electrical protective device mounted in said enclosure, said protective device comprising,
      1. a generally rectangular casing of insulating material;
      2. a contact-operating circuit interrupter in said casing;
      3. an electrically operable device in said casing for causing opening of said contact-operating circuit interrupter upon energizing of said electrically operable device;
      4. an electronic switch means mounted in said insulating casing and connected to said electrically operable device;
      5. a current unbalance signal generating device in said insulating casing for generating a signal upon the occurrence of predetermined current unbalance in a plurality of conductors and means connecting said signal-generating device to said electronic switch;
      6. said electrical protective device having first and second externally accessible line terminals for connection to a source of electric power;
      7. said electrical protective device having first and second externally accessible load terminals for connection to a load circuit to be controlled by said circuit-interrupter;
      8. first electrical conductor means within said casing and including said circuit interrupter connecting said first one of said line terminals to said first one of said load terminals;
      9. second electrical conductor means connecting said second one of said line terminals to said second one of said load terminals within said casing;
   c. at least one elongated power bus bar supported in insulated relation in said enclosure and having means for connecting a plurality of electric circuit control devices thereto;
   d. an elongated neutral bar conductor supported in said enclosure and including means for connecting a plurality of electrical conductors thereto;
   e. first component interconnecting means connecting said first one of said line terminals of said protective device to said power bus bar and
   f. second component interconnecting means connecting said second one of said line terminals of said protective device to said neutral bar conductor;
   g. said first and second electrical conductor means each including a portion associated with said current unbalance signal generating means whereby passage of a predetermined current from said first one of said load terminals to said second one of said line terminals by a path not including said conductor portion associated with said current - unbalance signal generating means causes a predetermined unbalance of currents in said first and second conductor portions, causing said signal-generating means to generate a signal and to actuate said electronic switch, said electronic switch when actuated serving to cause actuation of said electrically operable device to cause opening of said circuit interrupter and removal of power from said first load terminal.

10. An electrical protective panel assembly comprising:
   a. a generally rectangular box-like enclosure;
   b. at least a pair of first electric power bus bars supported in said enclosure each having a plurality of connecting means for connecting electric circuit control devices thereto;
   c. at least a pair of second electric power bus bars supported in said enclosure each having a plurality of connecting means for connecting electric circuit control devices thereto;
   d. a first neutral bar supported in said enclosure and including means for connecting a plurality of electrical conductors thereto;
   e. a second neutral bar supported in said enclosure and including means for connecting a plurality of electrical conductors thereto;
   f. an electrical protective device supported in said enclosure, said protective device having at least two pole sections and having an externally accessible line terminal for each pole of said device and an externally accessible load terminal for each pole of said device;
   g. means connecting said line terminals of said protective device each to a corresponding one of said first electric power bus bars;
   h. means connecting said load terminals of said protective device each to a corresponding one of said second electric power bus bars;
   i. neutral interconnecting conductor means connecting said second neutral bar to said first neutral bar;
   j. said protective device also including current unbalance signal generating means for generating a predetermined signal upon the occurrence of predetermined unbalance in the group of currents consisting of the currents in each of said poles and the current in said neutral interconnecting conductor means, and
   k. electrically operable means connected to said signal generating means for causing circuit interrupting action of said protective device and opening of both of said pole sections upon the generation of said predetermined signal by said signal generating means.

11. An electrical protective panel assembly as set forth in claim 10 wherein said current unbalance signal generating means comprises a differential transformer having a magnetically permeable core with a window and having a conductor electrically in series with each pole of said protective device passing there-through and also having said neutral interconnecting conductor means passing there-through, and a secondary winding generating a signal in response to unbalance in the currents in all said conductors passing through said window.

12. An electrical panel assembly as set forth in claim 11 wherein said protective device comprises an insulating casing having said electrical protective device and said differential transformer contained therein, the only externally exposed connecting means carried by said casing being means for connection to said first and second power bus bars, means for connecting to said first neutral bar, and means for connection to said second neutral bar.

13. An electrical protective device comprising:

a. a generally rectangular unitary casing of insulating material;
b. a contact-operating circuit interrupter in said casing, said circuit interrupter comprising at least one pair of separable contacts and operating means for moving said contacts between open and closed circuit condition, said operating means including manually operable means and automatically operable means comprising a normally latched releasable member releasable to cause automatic opening of said contacts, said circuit interrupter also including means responsive to the amplitude of current flow through said circuit interrupter to cause release of said releasable member;
c. an electrically operable device in said casing for causing opening of said contact-operating circuit interrupter upon actuation of said electrically operable device;
d. an electronic switch means mounted in said insulating casing and connecting to said electrically operable device;
e. a current unbalance signal generating device in said insulating casing for generating a signal upon the occurrence of predetermined current unbalance in a plurality of conductors and means connecting said signal-generating device to said electronic switch;
f. said electrical protective device having first and second externally accessible line terminals for connection to a source of electric power;
g. said electrical protective device having first and second externally accessible load terminals for connection to a load circuit to be controlled by said circuit-interrupter;
h. first electrical conductor means within said casing and including said circuit interrupter connecting said first one of said line terminals to said first one of said load terminals;
i. second electrical conductor means connecting said second one of said externally accessible line terminals to said second one of said externally accessible load terminals within said casing;
j. said first and second conductor means each including a portion associated with said current unbalance signal generating means, whereby passage of a predetermined current from said first one of said load terminals to said second one of said line terminals by a path not including said conductor portion associated with said current-unbalance signal-generating means causes a predetermined unbalance of currents in said first and second conductor portions, causing said signal-generating means to generate a signal and to actuate said electronic switch; and
k. said electronic switch, when actuated, serving to cause actuation of said electrically operable device to cause opening of said circuit interrupter and removal of power from said first load terminal.

14. An electrical protective device as set forth in claim 13 wherein said means responsive to the amplitude of current flow comprises both thermal and magnetic current responsive means.

15. An electrical protective device as set forth in claim 13, said current unbalance signal generating means and said electronic switch being operable to cause actuation of said electrically operable device upon the occurrence of a current unbalance in the order of 7 milliamperes whereby said electrical protective device is operable to afford protection from injury to a person by electric shock when contacting an energized portion of a circuit connected to said load terminals of said electrical protective device.

16. An electrical protective panel assembly comprising:
a. a generally rectangular box-like enclosure;
b. a pair of electric power bus bars supported in said enclosure each having a plurality of connecting means for connecting electric circuit control devices thereto;
c. a neutral bar supported in said enclosure and including means for connecting a plurality of electrical conductors thereto;
d. an electrical protective device supported in said enclosure, said protective device having at least two pole sections and having an externally accessible line terminal for each pole of said device and an externally accessible load terminal for each pole of said device;
e. means connecting said line terminals of said protective device each to a corresponding one of said electric power bus bars;
f. means connecting said load terminals of said protective device each to a different electrical load;
g. neutral connecting means connecting each of said different electrical loads to said neutral bar, said neutral connecting means including a serially-connected single conductor portion electrically common to all of said loads:
h. said protective device also including current unbalance signal generating means for generating a predetermined signal upon the occurrence of predetermined unbalance in the group of currents consisting of the currents in each of said poles and the current in said common neutral conductor, and
i. electrically operable means connected to said signal generating means for causing circuit interrupting action of said protective device and opening of both said pold sections upon the generation of said predetermined signal by said signal generating means.

17. An electrical protective panel assembly as set forth in claim 16 wherein said electrical protective device includes two neutral connecting terminals, one of which is connected to said common neutral conductor and the other of which is connected to said neutral bar whereby the neutral current for all of said loads passes through said circuit protective device in cooperative relation to said current unbalance signal generating means.

18. An electrical protective panel assembly as set forth in claim 16 wherein the voltage between said pair of electric power busbars is substantially two times the voltage between either one of said bus bars and said neutral bar.

19. An electrical protective panel assembly as set forth in claim 16 wherein said separate loads each comprise an electric power bus bar having a plurality of terminal portions spaced longitudinally thereon, and at least one electrical control device connected to each of said bus bars at one of said terminal portions and serving to control current to a power consuming load.

* * * * *